(12) United States Patent
Castelli et al.

(10) Patent No.: US 10,698,964 B2
(45) Date of Patent: Jun. 30, 2020

(54) SYSTEM AND METHOD FOR AUTOMATICALLY DETECTING AND INTERACTIVELY DISPLAYING INFORMATION ABOUT ENTITIES, ACTIVITIES, AND EVENTS FROM MULTIPLE-MODALITY NATURAL LANGUAGE SOURCES

(71) Applicant: INTERNATIONAL BUSINESS MACHINES CORPORATION, Armonk, NY (US)

(72) Inventors: Vittorio Castelli, Yorktown Heights, NY (US); Radu Florian, Yorktown Heights, NY (US); Xiaoqiang Luo, Yorktown Heights, NY (US); Hema Raghavan, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 20 days.

(21) Appl. No.: 15/419,615

(22) Filed: Jan. 30, 2017

(65) Prior Publication Data
US 2017/0140057 A1 May 18, 2017

Related U.S. Application Data

(62) Division of application No. 13/493,659, filed on Jun. 11, 2012.

(51) Int. Cl.
*G06F 40/295* (2020.01)
*G06F 16/28* (2019.01)
(Continued)

(52) U.S. Cl.
CPC ........ *G06F 16/9535* (2019.01); *G06F 16/338* (2019.01); *G06F 16/3344* (2019.01);
(Continued)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS 5,604,899 A * 2/1997 Doktor ................. G06F 16/288
5,696,916 A    12/1997 Yamazaki et al.
(Continued)

FOREIGN PATENT DOCUMENTS

CN         1620681         5/2005

OTHER PUBLICATIONS

A. Ratnaparkhi, "Learning to Parse Natural Language With Maximum Entropy Models," Kluwer Academic Publishers, Boston, pp. 1-28, 1999.
(Continued)

*Primary Examiner* — Lamont M Spooner
(74) *Attorney, Agent, or Firm* — F. Chau & Associates, LLC

(57) ABSTRACT

A method for automatically extracting and organizing information by a processing device from a plurality of data sources is provided. A natural language processing information extraction pipeline that includes an automatic detection of entities is applied to the data sources. Information about detected entities is identified by analyzing products of the natural language processing pipeline. Identified information is grouped into equivalence classes containing equivalent information. At least one displayable representation of the equivalence classes is created. An order in which the at least one displayable representation is displayed is computed. A combined representation of the equivalence classes that respects the order in which the displayable representation is displayed is produced.

12 Claims, 9 Drawing Sheets

(51) Int. Cl.
*G06F 16/9535* (2019.01)
*G06F 16/338* (2019.01)
*G06F 16/33* (2019.01)
*G06F 16/35* (2019.01)
*G06F 16/36* (2019.01)

(52) U.S. Cl.
CPC .............. *G06F 16/35* (2019.01); *G06F 16/36* (2019.01); *G06F 40/295* (2020.01)

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/2795; G06F 40/295; G06F 16/3331
USPC .................................................. 704/1, 9, 10
See application file for complete search history.

(56) References Cited

U.S. PATENT DOCUMENTS

| | | | | |
|---|---|---|---|---|
| 5,873,076 A * | 2/1999 | Barr | ................ | G06F 17/30864 704/270.1 |
| 5,980,096 A * | 11/1999 | Thalhammer-Reyero | ................ | G05B 17/02 |
| 6,205,441 B1 * | 3/2001 | Al-omari | .......... | G06F 16/24537 |
| 6,438,741 B1 * | 8/2002 | Al-omari | .......... | G06F 16/24542 707/694 |
| 6,446,081 B1 | 9/2002 | Preston | | |
| 6,567,805 B1 * | 5/2003 | Johnson | .............. | G06F 17/3061 704/9 |
| 6,745,161 B1 * | 6/2004 | Arnold | .............. | G06F 17/30616 704/7 |
| 6,816,858 B1 * | 11/2004 | Coden | ............... | G06F 17/30855 386/241 |
| 7,013,323 B1 * | 3/2006 | Thomas | ................. | G06Q 30/02 707/999.004 |
| 7,143,434 B1 * | 11/2006 | Paek | ................ | G06K 9/00711 725/142 |
| 7,185,016 B1 * | 2/2007 | Rasmussen | ............ | G06Q 10/10 |
| 7,269,598 B2 | 9/2007 | Marchisio | | |
| 7,272,610 B2 * | 9/2007 | Torres | ..................... | G06F 16/93 |
| 7,526,425 B2 * | 4/2009 | Marchisio | ......... | G06F 17/30672 704/9 |
| 7,610,191 B2 * | 10/2009 | Gao | .................... | G06F 17/2755 704/257 |
| 7,747,601 B2 | 6/2010 | Cooper et al. | | |
| 7,953,593 B2 | 5/2011 | Marchisio et al. | | |
| 7,958,109 B2 | 6/2011 | Lin et al. | | |
| 8,140,323 B2 * | 3/2012 | Johnson | ............... | G06F 17/2705 704/1 |
| 8,645,125 B2 * | 2/2014 | Liang | ..................... | G06F 16/93 704/9 |
| 8,700,604 B2 * | 4/2014 | Roseman | ............. | G06F 17/278 707/716 |
| 8,706,491 B2 * | 4/2014 | Chelba | .................. | G06F 17/271 704/231 |
| 8,768,910 B1 * | 7/2014 | Bunn | .................... | G06F 16/951 707/708 |
| 8,856,099 B1 * | 10/2014 | Lasko | ................... | G06F 16/951 707/706 |
| 8,874,550 B1 * | 10/2014 | Soubramanien | ....... | G06F 21/00 707/722 |
| 9,824,138 B2 * | 11/2017 | Pehle | .................... | G06F 16/951 |
| 2002/0023090 A1 * | 2/2002 | McGeachie | ....... | G06F 17/30557 |
| 2003/0176999 A1 * | 9/2003 | Calcagno | ............ | G06F 17/279 704/9 |
| 2003/0191625 A1 * | 10/2003 | Gorin | ..................... | G06F 17/278 704/1 |
| 2003/0195877 A1 * | 10/2003 | Ford | ...................... | G06Q 30/02 |
| 2003/0212543 A1 * | 11/2003 | Epstein | ................ | G06F 17/271 704/9 |
| 2003/0220913 A1 * | 11/2003 | Doganata | ............ | G06F 16/9535 |
| 2004/0148275 A1 * | 7/2004 | Achlioptas | ........ | G06F 17/30867 |
| 2005/0010551 A1 * | 1/2005 | McGeachie | ............ | G06Q 30/02 |
| 2005/0027512 A1 * | 2/2005 | Waise | ................... | G06F 17/271 704/9 |
| 2005/0027687 A1 * | 2/2005 | Nowitz | ............. | G06F 17/30038 |
| 2005/0043940 A1 * | 2/2005 | Elder | ................. | G06F 17/3043 704/9 |
| 2005/0108001 A1 * | 5/2005 | Aarskog | ............ | G06F 17/271 704/10 |
| 2005/0120003 A1 | 6/2005 | Drury et al. | | |
| 2006/0059129 A1 * | 3/2006 | Azuma | ................... | H04L 51/14 |
| 2006/0074634 A1 * | 4/2006 | Gao | ...................... | G06F 17/271 704/9 |
| 2006/0116994 A1 * | 6/2006 | Jonker | ..................... | G06N 5/02 |
| 2006/0248074 A1 * | 11/2006 | Carmel | ............. | G06F 17/30613 |
| 2006/0287987 A1 * | 12/2006 | McGeachie | ............ | G06Q 10/10 |
| 2007/0016580 A1 * | 1/2007 | Mann | ................ | G06F 17/30011 |
| 2007/0016616 A1 * | 1/2007 | Brill | ...................... | G06F 17/273 |
| 2007/0027671 A1 * | 2/2007 | Kanawa | ............ | G06F 17/2247 704/4 |
| 2007/0027672 A1 | 2/2007 | Decary et al. | | |
| 2007/0038601 A1 | 2/2007 | Guha | | |
| 2007/0078850 A1 * | 4/2007 | Aziz | ................... | G06Q 30/0603 |
| 2007/0179776 A1 * | 8/2007 | Segond | ............... | G06F 17/2247 704/9 |
| 2007/0214126 A1 | 9/2007 | Kikinis | | |
| 2007/0219986 A1 * | 9/2007 | Egozi | ..................... | G06F 16/313 |
| 2007/0282665 A1 * | 12/2007 | Buehler | .................. | G06Q 30/02 705/7.29 |
| 2008/0027707 A1 * | 1/2008 | Stefik | ................ | G06F 17/30864 704/9 |
| 2008/0034083 A1 * | 2/2008 | Koran | ...................... | H04L 41/065 709/224 |
| 2008/0065632 A1 * | 3/2008 | Nam | ..................... | G06F 16/957 |
| 2008/0077887 A1 * | 3/2008 | Malnati | ............... | G06F 16/2477 715/855 |
| 2008/0228675 A1 * | 9/2008 | Duffy | ..................... | G06F 17/278 706/10 |
| 2008/0243473 A1 | 10/2008 | Boyd et al. | | |
| 2008/0294978 A1 * | 11/2008 | Klintsov | ........... | G06F 17/30722 715/234 |
| 2008/0307055 A1 * | 12/2008 | Waters | ................. | G06F 21/6218 709/206 |
| 2008/0307503 A1 * | 12/2008 | Waters | ................... | G06Q 10/10 726/4 |
| 2009/0119268 A1 * | 5/2009 | Bandaru | ............. | G06F 17/2745 705/7.12 |
| 2009/0119276 A1 * | 5/2009 | Neron | ................ | G06F 17/30864 |
| 2009/0144319 A1 * | 6/2009 | Panwar | ............. | G06F 17/30569 |
| 2009/0171929 A1 | 7/2009 | Jing et al. | | |
| 2009/0228439 A1 | 9/2009 | Manolescu et al. | | |
| 2009/0307209 A1 * | 12/2009 | Carmel | ............. | G06F 17/3069 |
| 2010/0017427 A1 * | 1/2010 | Johnson | ............ | G06F 17/30961 707/E17.044 |
| 2010/0023319 A1 * | 1/2010 | Bikel | ..................... | G06F 17/241 704/9 |
| 2010/0076972 A1 * | 3/2010 | Baron | ................... | G06F 17/278 707/736 |
| 2010/0114899 A1 * | 5/2010 | Guha | .................. | G06F 17/30867 707/741 |
| 2010/0161662 A1 * | 6/2010 | Jonas | .................. | G06Q 10/107 707/780 |
| 2010/0205198 A1 * | 8/2010 | Mishne | ............... | G06F 16/3346 707/759 |
| 2010/0254604 A1 | 10/2010 | Prabhakara et al. | | |
| 2010/0299343 A1 * | 11/2010 | Ahari | ....................... | G06F 7/00 707/759 |
| 2010/0306249 A1 * | 12/2010 | Hill | ................... | G06F 17/30867 707/769 |
| 2011/0022549 A1 * | 1/2011 | Zhuang | .................. | G06F 16/00 706/12 |
| 2011/0040776 A1 * | 2/2011 | Najm | ................... | G06F 17/30648 707/766 |
| 2011/0055233 A1 * | 3/2011 | Weber | ................ | G06F 17/30625 707/752 |

(56) References Cited

U.S. PATENT DOCUMENTS

| | | | |
|---|---|---|---|
| 2011/0093488 A1* | 4/2011 | Amacker | G06Q 30/0643 707/767 |
| 2011/0099201 A1* | 4/2011 | Shen | G06Q 30/0631 707/771 |
| 2011/0128288 A1* | 6/2011 | Petrou | G06K 9/00664 345/428 |
| 2011/0131208 A1* | 6/2011 | Goldfarb | G06Q 30/02 707/736 |
| 2011/0225155 A1* | 9/2011 | Roulland | G06F 17/30598 707/737 |
| 2011/0246462 A1* | 10/2011 | Wu | G06F 16/951 707/736 |
| 2011/0258556 A1* | 10/2011 | Kiciman | G06Q 10/10 715/751 |
| 2011/0270604 A1* | 11/2011 | Qi | G06F 40/30 704/9 |
| 2011/0282888 A1 | 11/2011 | Koperski et al. | |
| 2011/0282892 A1* | 11/2011 | Castellani | G06F 17/30389 707/766 |
| 2011/0307440 A1* | 12/2011 | Panchenko | G06F 16/27 707/600 |
| 2012/0011428 A1* | 1/2012 | Chisholm | G06F 17/241 715/230 |
| 2012/0117475 A1* | 5/2012 | Lee | G06Q 10/10 715/733 |
| 2012/0128250 A1* | 5/2012 | Petrou | G06K 9/00456 382/182 |
| 2012/0128251 A1* | 5/2012 | Petrou | G06K 9/00456 382/182 |
| 2012/0134590 A1* | 5/2012 | Petrou | G06K 9/00483 382/182 |
| 2012/0136649 A1* | 5/2012 | Freising | G06F 16/3334 704/9 |
| 2012/0158687 A1* | 6/2012 | Fang | G06N 5/02 707/706 |
| 2012/0185484 A1* | 7/2012 | Jones | G06Q 10/101 707/740 |
| 2012/0197862 A1* | 8/2012 | Woytowitz | G06F 17/30731 707/710 |
| 2012/0203766 A1* | 8/2012 | Hornkvist | G06F 17/30112 707/722 |
| 2012/0203861 A1* | 8/2012 | Flack | G06Q 10/10 709/217 |
| 2012/0226715 A1* | 9/2012 | DeRose | G06F 16/284 707/792 |
| 2013/0054228 A1* | 2/2013 | Baldwin | G06Q 30/02 704/9 |
| 2013/0091116 A1* | 4/2013 | Kumar | G06F 16/951 707/708 |
| 2013/0124490 A1* | 5/2013 | Naranjo | G06F 16/90324 707/706 |
| 2013/0332450 A1 | 12/2013 | Castelli et al. | |
| 2014/0108439 A1* | 4/2014 | Lamba | G06F 16/9535 707/758 |
| 2015/0066479 A1* | 3/2015 | Pasupalak | G06F 40/40 704/9 |
| 2015/0363688 A1* | 12/2015 | Gao | G06N 3/082 706/27 |

OTHER PUBLICATIONS

Xiaoqiang Luo, et al., "Multi-Lingual Coreference Resolution With Syntatic Features," Proceedings of Human Language Technology Conference and Conference on Empirical Methids in Natural Language Processing, pp. 660-667, Vancouver, Oct. 2005.

George Doddinton, et al., "The Automatic Content Extraction (ACE) Program Tasks, Data, and Evaluation," Fourth International Conference on Language Resources and Evaluation, pp. 837-840, 2004.

Yoav, Freund, et al., "Large Margin Classification Using the Perceptron Algorithm," Machine Learning, 37(30: 277-296, 1999.

R. Florian, et al., "A Statiscal Model for Multilingual Entity Detection and Tracking," HLT-NAACL 2004, pp. 1-8.

Adam L. Berger, et al., "A Maximum Entrophy Approach to Natural Language Processing," 1996, Association for Computational Linguistics, vol. 22, No. 1, pp. 1-71.

Heng Ji, et al., "Overview of the TAC 2010 Knowledge Base Population Track," 2010.

"ACE (Automatic Content Extraction) English Annotation Guideline for Relations," http://projects.ldc.upenn.edu/ace/docs/english-relations-guidelines_version 6.2, Apr. 28, 2008.

Fabrizio Sebastiani, et al., "A Tutorial on Automated Text Categorisation," pp. 1-25, 1999.

Franz, Josef Och, et al., "A Systematic Comparison of Various Statistical Alignment Models," 2003, Association for Computational Linguistics, pp. 1-51.

Roberto, Navigli, "Word Sense Disambiguation: A Survey," ACM Computing Surveys, vol. 41, No. 2, Article 10, Feb. 2009.

Franz Josef Och, "Statistical Machine Translation: Foundations and Recent Advances," Tutorial at Mt Summit 2005, Sep. 12, 2005.

Chapter6, Statistical Inference: N-Gram Model Over Sparse Data, Jan. 13, 2005, pp. 1-20.

Keechul, Jung, et al., "Text Information Extraction in Images and Video: A Survey," Pattern Recognition, vol. 37 (2004) pp. 977-997.

Raphael Hoffmann, "Tutorial on Probabilistic Context-Free Grammars," 590A1, Winter 2009.

Vittorio Castelli, et al., "Entity Tracking on Cross-Lingual News," Aug. 12, 2012.

Monika Henzinger, Tutorial: Web Information Retrieval, 2000.

David Smith, "Hidden Markov Models," pp. 1-32, 2009.

Research on Keyphrase Extraction Based Automatic Summarization Method for Chinese Webpage, http://www.docin.com/p-699449110.html, 2010.

Christian Bizer, et al., "DBPEDIA—A Crystallization Point for the Web of Data," A Multilingual Cross-domain Knowledge Base. In: LREC. 2012, pp. 1-25.

German Office Action dated Jan. 28, 2015.

* cited by examiner

| Search Input: | A B C D E F G H I J K L M N O P Q R S T U V W X Y Z | | | |
|---|---|---|---|---|
| | Search  Clear | | | |

| People | Cnt | Organizations | Cnt | GeoPolitical Entities | Cnt |
|---|---|---|---|---|---|
| Mitt Romney | 988 | Morning Edition | 20 | Massachusetts | 34 |
| Muammar Gaddafi | 924 | Muslim Brotherhood | 18 | Mexico | 30 |
| Mahmoud Abbas | 468 | Ministry of Public Security of the People's Republic of China | 12 | Metro Detroit | 8 |
| Michelle Bachmann | 270 | Medicare Australia | 12 | Muskingum County, Ohio | 6 |
| Muhammad: A Prophet for Our Time | 156 | Massachusetts Institute of Technology | 10 | Munich | 6 |
| Mark Spitz | 138 | Mens Sana Basket | 10 | Mississippi | 6 |
| Marco Rubio | 134 | Michigan Department of Natural Resources | 8 | Montreal | 4 |
| Mahmoud Ahmadinejad | 106 | McAfee | 6 | Mosul | 4 |
| Marian McPartland | 100 | Medill School of Journalism | 6 | Madrid | 4 |
| Mitch McConnell | 98 | Ministry of Health of the People's Republic of China | 6 | Mumbai | 4 |
| Michele Norris | 82 | MLB Network | 4 | Mogadishu | 4 |
| Moses | 80 | Massachusetts General Hospital | 4 | Morocco | 4 |
| Martin Luther King, Jr. | 78 | Mexican American Legal Defense and Educational Fund | 4 | Medina County, Ohio | 4 |
| Mario Draghi | 68 | Morehouse College | 4 | Montevideo | 2 |
| Mike Thompson | 68 | Moscow state Institute of International Relations | 4 | Massilon, Ohio | 2 |
| Michelle Obama | 68 | | | Morgantown, West Virginia | 2 |
| Mike Napoli | 60 | | | | |
| Max Wertheimer | 52 | | | | |
| Mark Zuckerberg | 50 | | | | |

SYSTEM AND METHOD FOR AUTOMATICALLY DETECTING AND INTERACTIVELY DISPLAYING INFORMATION ABOUT ENTITIES, ACTIVITIES, AND EVENTS FROM MULTIPLE-MODALITY NATURAL LANGUAGE SOURCES

CROSS-REFERENCE TO RELATED APPLICATION

This application is a Divisional Application of co-pending U.S. patent application Ser. No. 13/493,659, filed on Jun. 11, 2012, the entire contents of which are incorporated by reference herein.

STATEMENT REGARDING FEDERALLY SPONSORED RESEARCH OR DEVELOPMENT

This invention was made with Government support under Contract No.: HR0011-08-C-0110 (awarded by Defense Advanced Research Project Agency) (DARPA). The Government has certain rights in this invention.

BACKGROUND

Technical Field

The present disclosure relates to information technology, and, more particularly, to natural language processing (NLP) systems.

Discussion of Related Art

News agencies, bloggers, twitters, scientific journals and conferences, all produce extremely large amounts of unstructured data in textual, audio, and video form. Large amounts of such unstructured data and information can be gathered from multiple modalities in multiple languages, e.g., internet text, audio, and video sources. There is a need for analyzing the information and producing a compact representation of: 1) information such as actions of specific entities (e.g., persons, organizations, countries); 2) activities (e.g., the presidential election campaign); and 3) events (e.g., the death of a celebrity). Currently, such representations can be produced manually, but this solution is not cost effective and it requires skilled workers especially when the information is gathered from multiple languages. Such manually produced representations are also generally not scaleable.

BRIEF SUMMARY

Exemplary embodiments of the present disclosure provide methods for automatically extracting and organizing data such that a user can interactively explore information about entities, activities, and events.

In accordance with exemplary embodiments information may be automatically extracted in real time from multiple modalities and multiple languages and displayed in a navigable and compact representation of the retrieved information.

Exemplary embodiments may use natural language processing techniques to automatically analyze information from multiple sources, in multiple modalities, and in multiple languages, including, but not limited to, web pages, blogs, newsgroups, radio feeds, video, and television.

Exemplary embodiments may use the output of automatic machine translation systems that translate foreign language sources into the language of the user, and use the output from automatic speech transcription systems that convert video and audio feeds into text.

Exemplary embodiments may use natural language processing techniques including information extraction tools, question answering tools, and distillation tools, to automatically analyze the text produced as described above and extract searchable and summarizable information. The system may perform name-entity detection, cross-document co-reference resolution, relation detection, and event detection and tracking.

Exemplary embodiments may use automatic relevance detection techniques and redundancy reduction methods to provide the user with relevant and non-redundant information.

Exemplary embodiments may display the desired information in a compact and navigable representation by: providing means for the user to specify entities, activities, or events of interest (for example: by typing natural language queries, by selecting entities from an automatically generated list of entities that satisfy user specified requirements, such as, entities that are prominently featured in the data sources over a user specified time, by selecting sections of text by browsing an article, or by selecting events or topics from representations of automatically detected events/topics over a specified period of time Exemplary embodiments may automatically generate a page in response to the user query by adaptively building a template that best matches the inferred user's intention (for example: if the user selects a person, who is a politician, the system would detect this fact, search for information on election campaign, public appearances, statements, and public service history of the person; if the user selects a company, the system would search for recent news about the company, for information on the company's top officials, for press releases, etc.)

In accordance with exemplary embodiments, if the user selects an event, the system may search for news items about the event, for reactions to the event, for outcomes of the event, and for related events. The system may also automatically detect the entities involved in the event, such as people, countries, local governments, companies and organizations, and retrieve relevant information about these entities.

Exemplary embodiments may allow the user to track entities that appear on the produced page, including automatically producing a biography of a person from available data and listing recent actions by an organization automatically extracted from the available data.

Exemplary embodiments may allow the user to explore events or activities that appear on the page, including: automatically constructing a timeline of the salient moments in an ongoing event.

Exemplary embodiments may allow the user to explore the connections between entities and events (for example: providing information on the role of a company in an event, listing quotes by a person on a topic, describing the relation between two companies, summarizing meetings or contacts between two people and optionally retrieving images of the desired entities.

According to an exemplary embodiment, a method for automatically extracting and organizing information by a processing device from a plurality of data sources is provided. A natural language processing information extraction pipeline that includes an automatic detection of entities is applied to the data sources. Information about detected entities is identified by analyzing products of the natural language processing pipeline. Identified information is grouped into equivalence classes containing equivalent information. At least one displayable representation of the equivalence classes is created. An order in which the at least one displayable representation is displayed is computed. A combined representation of the equivalence classes that respects the order in which the displayable representation is displayed is produced.

Each equivalence classes may include a collection of items. Each item may include a span of text extracted from a document, together with a specification of information about a desired entity derived from the span of text.

Computing an order in which the displayable representations are displayed may include randomly computing the order.

Grouping identified information into equivalence classes may include assigning each identified information to a separate equivalence class.

Grouping identified information into equivalence classes may include computing a representative instance of each equivalence class, ensuring that representative instances of different classes are not redundant with respect to each other, and ensuring that instances of each equivalence class are redundant with respect to the representative instance of the equivalence class.

According to an exemplary embodiment, a method for processing information by a processing device is provided. A user query is received. A user query intention is inferred from the user query to develop an inferred user intention. A page is automatically generated in response to the user query by adaptively building a template that corresponds to the inferred user intention using natural processing of multiple modalities comprising at least one of text, audio and video.

When the user query selects a person who has a political status, the political status may be searched, information on at least one of an election campaign, public appearances, statements, and public service history, may be searched, and a page in response to the user query may be automatically generated.

When the user query selects a company information on at least one of recent news about the company, information on the company's top officials, and press releases for the company, may be searched, and a page in response to the user query may be automatically generated.

When the user query selects an event information on at least one of news items about the event and reactions to the event may be searched, and a page in response to the user query may be automatically generated.

Entities in the event and retrieved relevant information about the entities may be identified and searched.

According to an exemplary embodiment, a method for automatically extracting and organizing information by a processing device from a corpus of documents having multiple modalities of information in multiple languages for display to a user is provided. The corpus of documents is browsed to identify and incrementally retrieve documents containing audio/video files. Text from the audio/video files is transcribed to provide a textual representation. Text of the textural representation that is in a foreign language is translated. Desired information about at least one of entities, activities, and events is incrementally extracted. Extracted information is organized. Organized extracted information is converted into a navigable display presentable to the user.

Incrementally extracting desired information may include applying a natural language processing pipeline to each document to iterate all entities detected in the corpus and identifying relation mentions and event mentions that involve a selected entity, wherein an entity is at least one of a physical animate object, a physical inanimate object, something that has a proper name, something that has a measurable physical property, a legal entity and abstract concepts, a mention is a span of text that refers to an entity, a relation is a connection between two entities, a relation mention is a span of text that describes a relation, and an event is a set of relations between two or more entities involving one or more actions.

Organizing extracted information may include iterating on all the entities identified in the corpus, dividing the information extracted about the entity into selected equivalence classes containing equivalent information, iterating on all the equivalence classes, selecting one item in each equivalence class to represent all items in the equivalence class, and recording information about the equivalence class and about a representative selected for use in producing the navigable display, wherein each equivalence class may include a collection of items, each item having a span of text extracted from a document, together with a specification of the information about the desired entity derived from the span of text.

Converting organized extracted information into a navigable display presentable to the user may include scoring the equivalence classes of information by assigning to the equivalence class at least one of a highest score of the pieces of information in the class, the average score of its members, the median score of its members, and the sum of the scores of its members, sorting the equivalence classes in descending order of score to prioritize an order in which the equivalence classes are displayed to the user, iterating for each equivalence class, constructing of a displayable representation of an instance selected and combining the displayable representations to produce a displayable representation of the equivalence classes.

The displayable representation may include a passage containing extracted information marked up with visual highlights.

According to an exemplary embodiment, a non-transitory computer program storage device embodying instructions executable by a processor to interactively display information about entities, activities and events from multiple-modality natural language sources is provided. An information extraction module includes instruction code for downloading document content from text and audio/video, for parsing the document content, for detecting mentions, for co-referencing, for cross-document co-referencing and for extracting relations. An information gathering module includes instruction code for extracting acquaintances, biography and involvement in events from the information extraction module. An information display module includes instruction code for displaying information from the information gathering module.

The information extraction module further may include instruction code for transcribing audio from video sources and for translating non-English transcribed audio into English text.

The information extraction module may include instruction code for clustering mentions under the same entity and for linking the entity clusters across documents.

The information gathering module may include instruction code for inputting a sentence and an entity and extracting specific information about the entity from the sentence.

The information display module may include instruction code for grouping results into non-redundant sets, sorting the sets, producing a brief description of each set, selecting a representative snippet for each set, highlighting the portions of the snippet that contain information pertaining to a specific tab, constructing navigation hyperlinks to other pages, and generating data used to graphically represent tab content.

According to an exemplary embodiment, a non-transitory computer program storage device embodying instructions executable by a processor to automatically extract and organize information from a plurality of data sources, is provided. Instruction code is provided for applying to the data sources a natural language processing information extraction pipeline that includes an automatic detection of entities. Instruction code is provided for identifying information about detected entities by analyzing products of the natural language processing pipeline. Instruction code is provided for grouping identified information into equivalence classes containing equivalent information. Instruction code is provided for creating at least one displayable representation of the equivalence classes. Instruction code is provided for computing an order in which the at least one displayable representation is displayed. Instruction code is provided for producing a combined representation of the equivalence classes that respects the order in which said displayable representation is displayed.

BRIEF DESCRIPTION OF THE SEVERAL VIEWS OF THE DRAWINGS

Exemplary embodiments will be more clearly understood from the following detailed description taken in conjunction with the accompanying drawings in which:

FIGS. 7(a) and 7(b) depict exemplary entity pages for a news broadcasting application.

DETAILED DESCRIPTION

Figure 1:
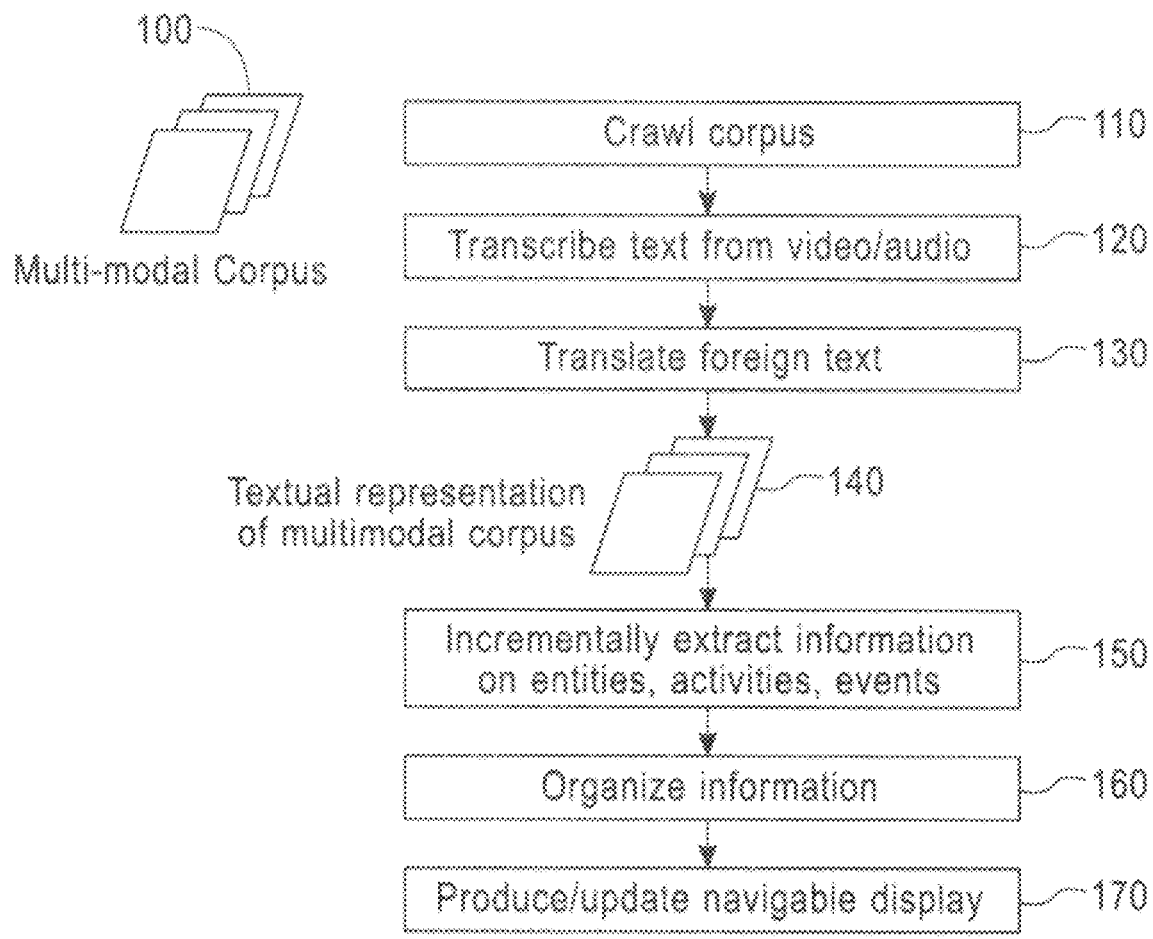
FIG. 1 depicts a sequence of operational steps in accordance with an exemplary embodiment.

Reference will now be made in more detail to the exemplary embodiments, examples of which are illustrated in the accompanying drawings, wherein like reference numerals refer to the like elements throughout.

In the exemplary embodiments, the term "document" may refer to a textual document irrespective of its format, to media files including streaming audio and video, and to hybrids of the above, such as web pages with embedded video and audio streams.

In the exemplary embodiments, the term "corpus" refers to a formal or informal collection of multimedia documents, such as all the papers published in a scientific journal or all the English web pages published by news agencies in Arabic-speaking countries.

In the exemplary embodiments, the term "entity" may refer to a physical animate object (e.g., a person), to a physical inanimate object (e.g., a building), to something that has a proper name (e.g., Mount Everest), to something that has a measurable physical property (e.g., a point in time or a span of time, a company, a township, a country), to a legal entity (e.g., a nation) and to abstract concepts, such as the unit of measurement and the measure of a physical property.

In the exemplary embodiments, the term "mention" denotes a span of text that refers to an entity. Given a large structured set of documents, an entity may be associated with the collection of all of its mentions that appear in the structured set of documents, and, therefore, the term entity may also be used to denote such collection.

In the exemplary embodiments, the term "relation" refers to a connection between two entities (e.g., Barack Obama is the president of the United States; Michelle Obama and Barack Obama are married). A relation mention is a span of text that explicitly describes a relation. Thus, a relation mention involves two entity mentions.

In the exemplary embodiments, the term "event" refers to a set of relations between two or more entities, involving one or more actions.

FIG. 1 shows an overview of an exemplary embodiment which may be applicable to a corpus of news documents consisting of web pages created by news agencies and containing multiple modalities of information in multiple languages. Multimodal corpus 100 is browsed in a methodical automated manner (i.e., crawled) in Step 110, wherein the multi-modal documents in the corpus are identified and incrementally retrieved. Such crawling can operate in an incremental fashion, in which case it would retrieve only documents that were not available during previous crawling operations. Documents containing audio information, such as audio files or video files with audio, are then analyzed by transcription at Step 120. After Step 120, a textual representation of all the multi-modal documents is available. Text in foreign languages is translated at translation step 130. The result is textual representation 140 of the multimodal corpus that contains documents in a desired language as well as their original version in their source language.

Textual representation 140 of the corpus is incrementally analyzed in Step 150, which extracts desired information (information extraction (IE)) about entities, activities, and events. The extracted information is organized in Step 160, and the organized information is converted into a navigable display form that is presented to the user.

Figure 2:
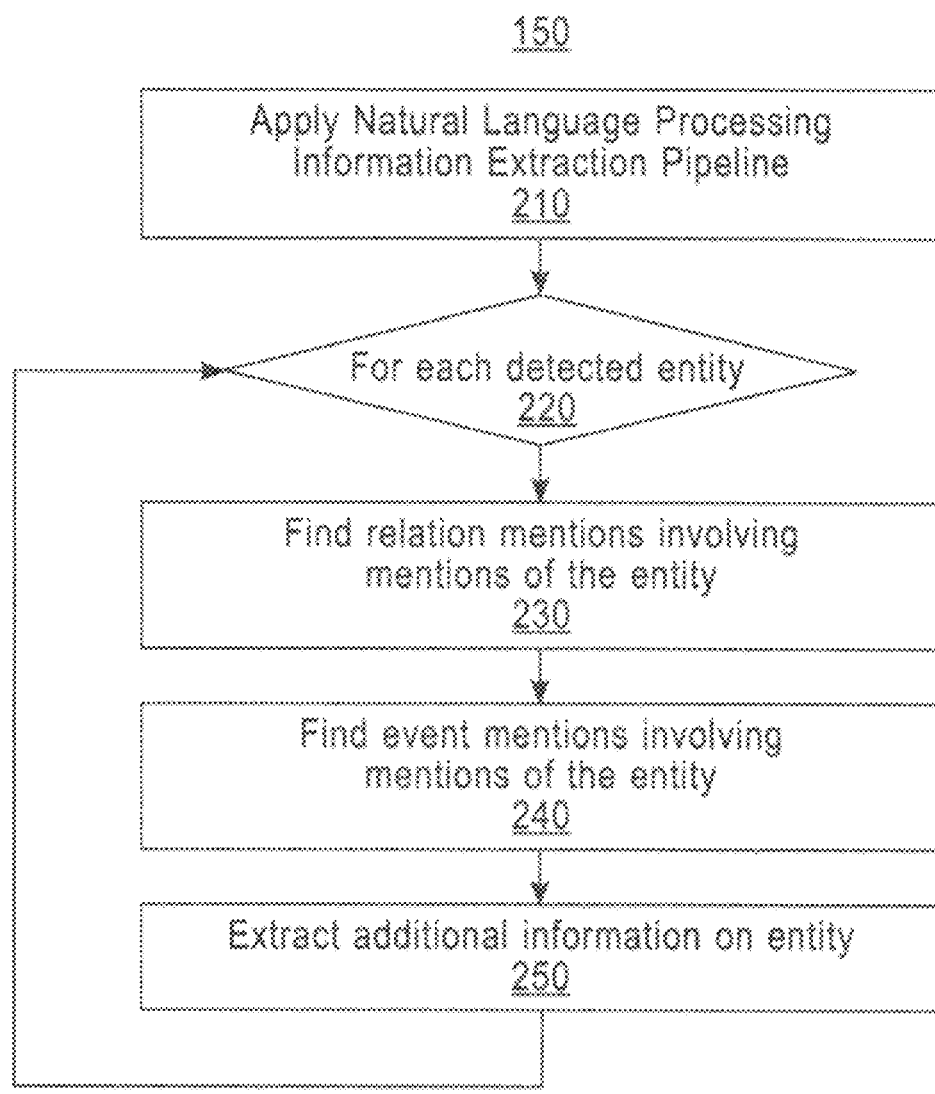
FIG. 2 depicts a sequence of operational steps in accordance with a portion of the operational steps of FIG. 1.

FIG. 2 shows an IE process, according to an exemplary embodiment, of Step 150 wherein information on entities, activities, and events are incrementally extracted. Step 210 consists of applying a natural language processing pipeline to each document of the collection. The pipeline can be applied incrementally as new documents are added to the corpus. Step 220 iterates over all entities detected in the corpus. Step 220 can be applied incrementally by iterating only on the entities detected in new documents as they are added to the corpus. Step 230 identifies relation mentions extracted by Step 210 that involve the entity selected by Step 220. Step 240 identifies event mentions involving mentions of the entity selected by Step 220. Step 250 extracts information pertaining to the entity selected by Step 220.

Figure 3:
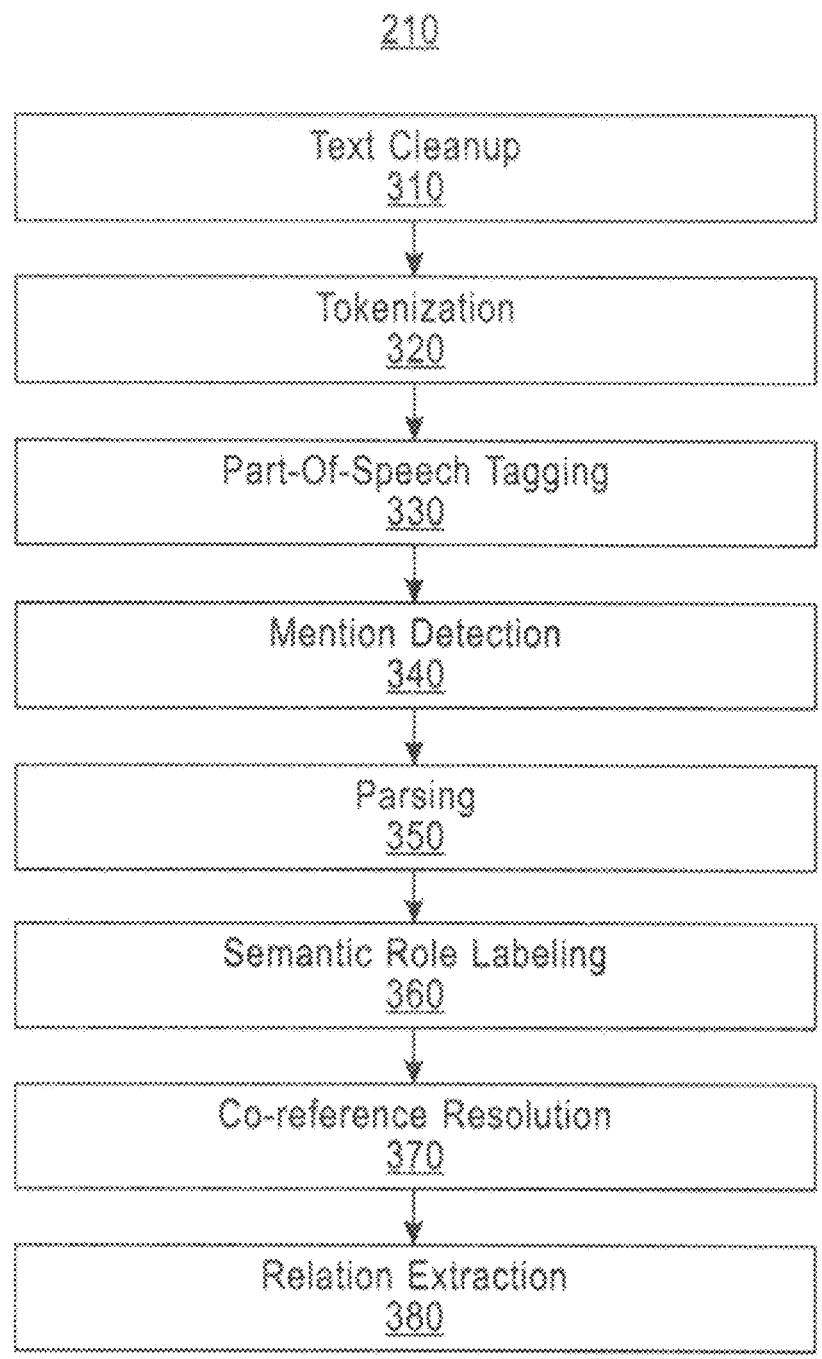
FIG. 3 depicts a sequence of operational steps in accordance with a portion of the operational steps of FIG. 2.

FIG. 3 shows an example of natural language processing pipeline Step 210 as described in FIG. 2. Text Cleanup Step 310 removes from the text irrelevant characters, such as formatting characters, HyperText Markup Language (HTML) tags, and the like. Tokenization Step 320 analyzes the cleaned-up text and identifies word and sentence boundaries. Part-of-speech tagging Step 330 associates to each word a label that describes its grammatical function. Mention detection Step 340 identifies in the tokenized text the mentions of entities and the words that denote the presence of events (called event anchors). Parsing Step 350 extracts the hierarchical grammatical structure of each sentence, and typically represents it as a tree. Semantic role labeling Step 360 identifies how each of the nodes in the tree extracted by parsing Step 350 is semantically related to each of the verbs in the sentence. Co-reference resolution Step 370 identifies the entities to which the mentions produced by the mention detection 340 belong. Relation extraction Step 380 detects relations between entity mention pairs and between entity mention and event anchors. Those of ordinary skill in the art would appreciate that these steps can be implemented using generally known statistical methods, rules, or combinations thereof.

Figure 4:
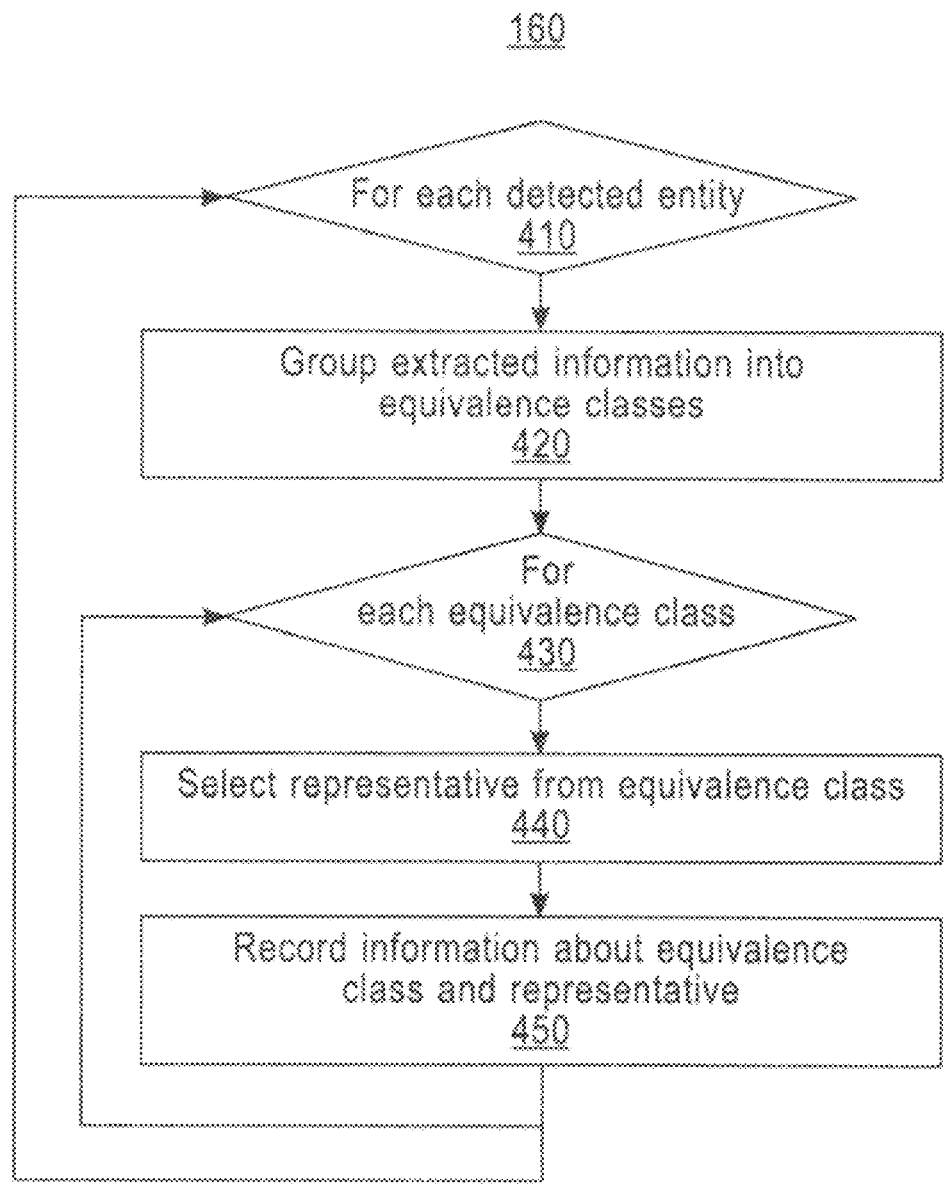
FIG. 4 depicts a sequence of operational steps in accordance with a portion of the operational steps of FIG. 1.

FIG. 4 shows an exemplary embodiment of organizing the information about entities according to Step 160 of FIG. 1.

Step 410 iterates over all the entities identified in the corpus. An incremental embodiment of Step 410 consists of iterating on all the entities identified in new documents as they are added to the corpus.

Step 420 divides the information extracted about the entity selected by iteration Step 410 into equivalence classes, containing equivalent or redundant information. In an exemplary embodiment, each equivalence class would consist of a collection of items, where each item consists of a span of text extracted from a document, together with a specification of the information about the desired entity derived from the span of text. Those of ordinary skill in the art would appreciate that such equivalence classes could be mutually exclusive or could overlap, wherein the same item could belong to one or more equivalence class.

Step 430 iterates on the equivalence classes produced by Step 420.

Step 440 would select one item in the class that best represents all the items in the class. Selection criteria used by selection Step 440 can include, but not be limited to: selecting the most common span of text that appears in the equivalence class (for example, the span "U.S. President Barack Obama" is more common than "Barack Obama, the President of the United States", and, according to this selection criterion, would be chosen as the representative span to describe the relationship of "Barack Obama" to the "United States"), selecting the span of text that conveys the largest amount of information (for example, "Barack Obama is the 44th and current President of the United States" conveys more information about the relationship between "Barack Obama" and the "United States" than "U.S. President Barack Obama", and would be chosen as representative according to this criterion), and selecting the span of text with the highest score produced by the extraction Step 150, if the step associates a score with its results.

Step 450 records the information about the equivalence class and about the representative selected by Step 440, so that the information can be used by the subsequent Step 170 of FIG. 1. The method shown in FIG. 4 can be adapted to the case in which equivalence classes can overlap and it is still desirable to select distinct representatives for different classes, for example, by means of an optimization procedure that would combine one or more of the selection criteria listed above or of equivalent selection criteria with a dissimilarity measure that would favor the choice of distinct representatives for overlapping equivalence classes.

In an exemplary embodiment of Step 420, an individual instance of extracted information may consist of a span (equivalently, a passage) from a document together with a specification of the information extracted about a desired entity from the span. Such specification can consist of a collection of attribute-value pairs, a collection of Research Description Framework (RDF) triples, a set of relations in a relational database, and the like. The specification can be represented using a description language, such as Extensible Markup Language (XML), using the RDF representation language, using a database, and the like.

Step 420 may consist of identifying groups of instances of extracted information satisfying two conditions: the first being that each group contains at least one instance (main instance) given which all other instances in the group are redundant; the second being that main instances of separate groups are not redundant with respect to each other. This result can be accomplished using a traditional clustering algorithm or an incremental clustering algorithm.

Figure 5:
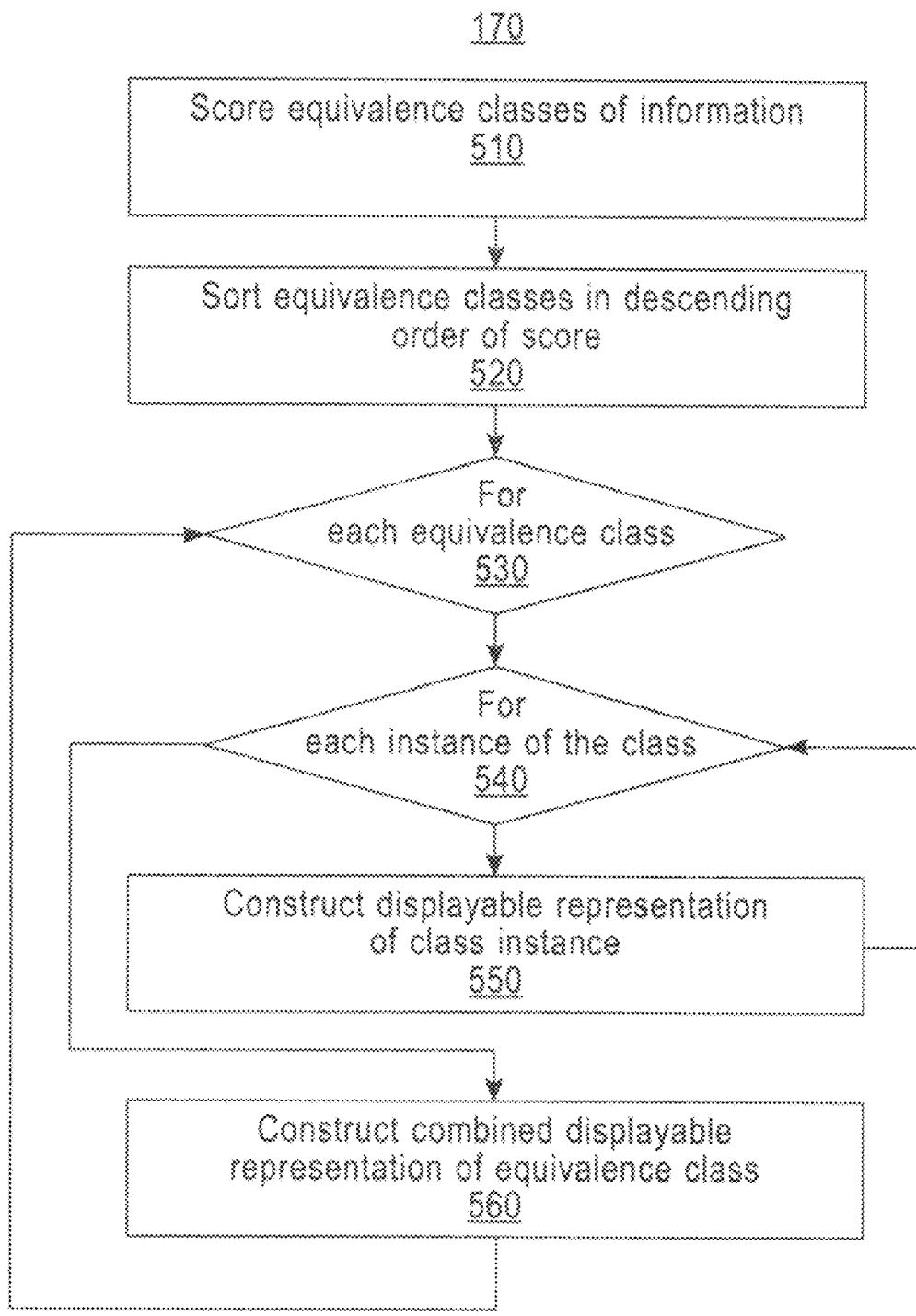
FIG. 5 depicts a sequence of operational steps in accordance with a portion of the operational steps of FIG. 1.

FIG. 5 shows an exemplary embodiment of a method of Step 170 of FIG. 1 for constructing a displayable representation of the information pertaining to an entity and collected according to the method described in FIG. 4.

In Step 510 the equivalence classes of information produced by Step 420 are scored, for example, by assigning to the equivalence class the highest score of the pieces of information in the class. Alternatively, other quantities can be used as the score of the equivalence class, for example: the average score of its members, the median score of its members, the sum of the scores of its members, and the like. According to the method described in FIG. 5, the score is used to prioritize the order in which the equivalence classes are displayed to the user.

Step 520 sorts the equivalence classes in descending order of score.

Step 530 selects each equivalence class. For all the instances of the equivalence class selected (Step 540), Step 550 constructs a displayable representation of the instance selected from the equivalence class. In an exemplary embodiment, such displayable representation consists of the passage containing the extracted information, appropriately marked up with visual highlights. Such visual highlights may include color to differentiate the extracted information. Additionally, the displayable representation could include visual cues to easily identify other entities for which an information page exists.

Step 560 combines the representations produced by Step 550 to produce a displayable representation of the equivalence class. In an exemplary embodiment, this step consists of displaying the representative instance of the equivalence class and providing means for displaying the other members, for instance, by providing links to the representation of these members.

Figure 6:
FIG. 6 depicts an exemplary entity page in accordance with an exemplary embodiment.
Figure 6:

Referring now to FIG. 6, an exemplary page describing an entity (i.e., an Entity page (EP)) for the individual Leon Panetta is depicted. The page is divided into a left and a right part. The two frames in the left part contain a picture and biographical information automatically extracted from the Wikipedia internet encyclopedia or from another source of reliable information, respectively. The right part contains a set of tabs that organize relevant small pieces (snippets) of text by the kind of information they convey. The content in each tab is the output of a series of information extraction modules which are described in further detail below. Each tab also shows a graphical summary of the content of its content.

Table 1, shown below, summarizes the information conveyed by the snippets of text in each tab.

TABLE 1

Description of Information Contained in the GUI Tabs, Organized by Entity Type.

| Entity Type | Tab Title | Description |
|---|---|---|
| Person | Affiliations | Describe affiliations of the person to companies, organizations, governments, agencies, etc |
|  | Statements | Report statements made by the person on any topic |
|  | Actions | Describe the actions of the person |
|  | Related People | List acquaintances of the person |
|  | Locations | List places & locations visited by the person |
|  | Elections | Describe election campaign of the person |
|  | Involvment in Events | Describe events in which the person is involved |
| ORG & GPE | Actions | Describe actions of the organization or of official representatives |
|  | Related Orgs | Describe related organizations, such as subsidiaries. |
|  | Associated People | List people associated with the ORG/GPE |
|  | Statements | Report statements released by the organization or made by representatives |

These snippets are selected by a collection of Information Gathering Modules (Itab, aMs) specified in a configuration file. A typical IGM is based upon a machine learning model, further described below. Each IGM also associates a relevance score with each snippet.

To assemble the tab content, the snippets selected and scored by the IGMs are analyzed by appropriate Information Display Modules (IDMs), specified in a configuration file. IDMs group snippets with identical information for a tab into the same equivalence class. IDMs associate a score to each equivalence class, and sort the classes according to the score.

To visualize each equivalence class, IDMs produce a title, which is a short representation of the information it conveys, and select a representative snippet. They highlight the portions of the representative snippet that contain the information of interest to the tab, and create links to pages of other entities mentioned in the snippets. Additional sentences in the equivalence class are shown by clicking a link marked "Additional Supporting Results . . . ". Since news agencies often reuse the same sentences over time, such sentences are available by clicking "Other Identical Results".

IDMs create the data used to produce a visual summary of the content in the selected tab, shown in the rightmost frame of the top half of the GUI. For the Related People tab depicted in FIG. 6, this visualization is a network of relationships. For other tabs, it is a cloud of the content words in the tab.

The interface is not only useful for an analyst tracking an entity in the news, but also for financial analysts following news about a company, or web users getting daily updates of the news. The redundancy detection and systematic organization of information makes the content easy to digest.

Figure 7A:
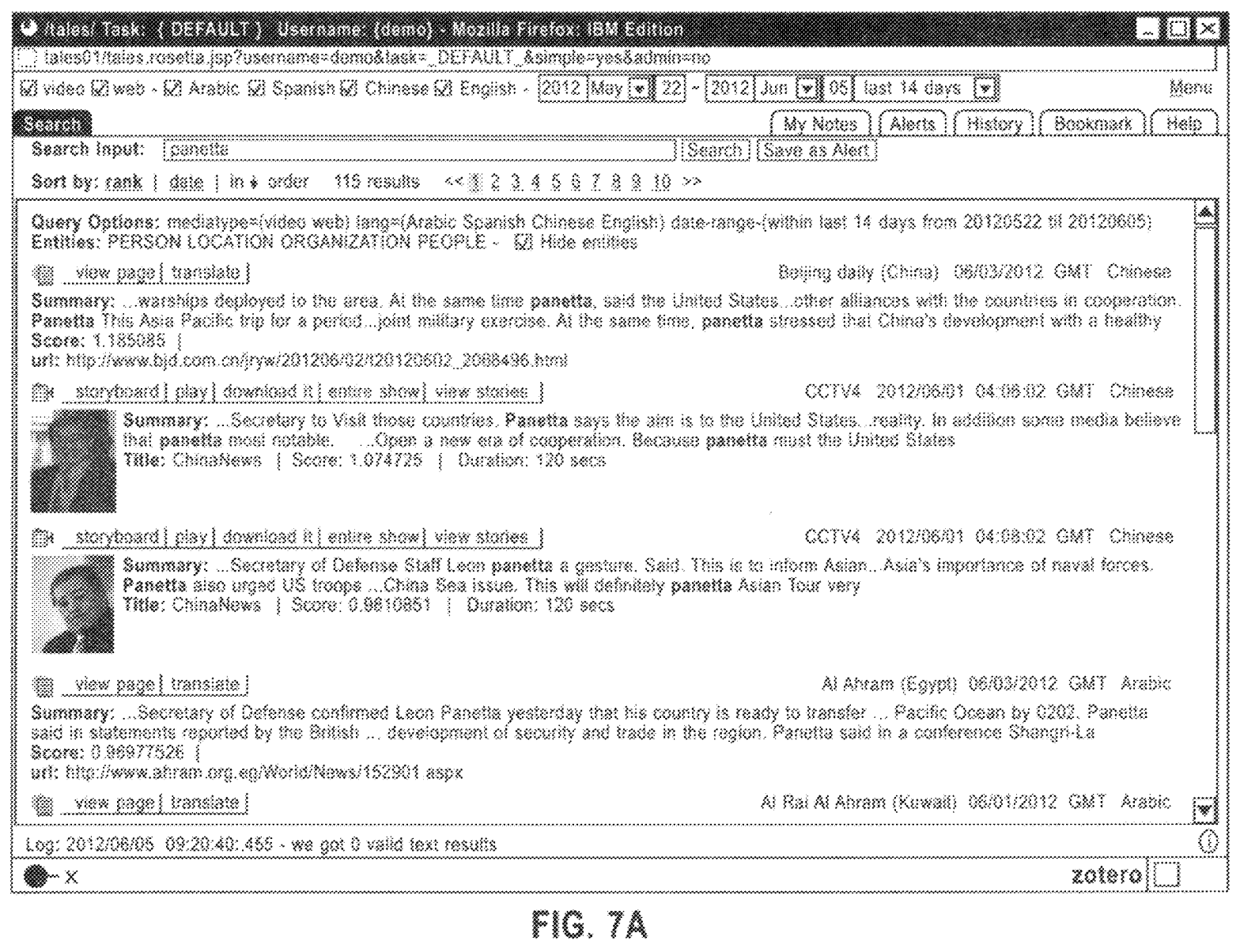

In a news browsing application, entities can be highlighted in articles, as depicted in FIG. 7(a), and those entities for which an EP exists (i.e., there are relevant snippets for at least one tab) are hyperlinked to the EP. Users can also arrive at the EP by viewing a searchable list of entities in alphabetic order, or by frequency in the news as depicted in FIG. 7(b).

Figure 8:
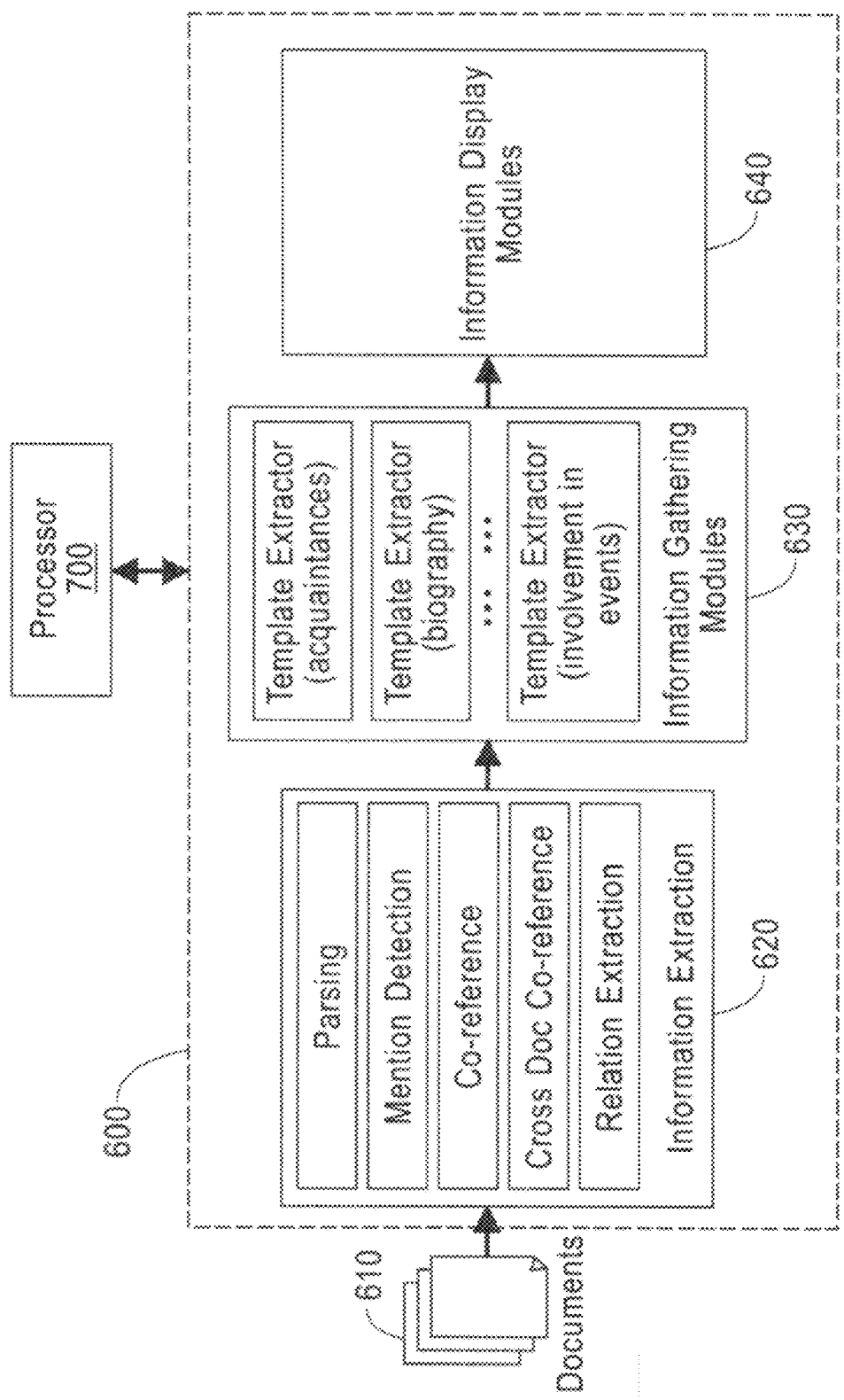
FIG. 8 depicts a program storage device and processor for executing a sequence of operational steps in accordance with an exemplary embodiment.

FIG. 8 shows an overview of an exemplary embodiment of program storage device 600 wherein instruction code contained therein for an IE, IGM and IDM are depicted. Processor 700 executes the instruction code stored in program storage device 600.

A crawler as previously described above can periodically download new content from a set of English text and Arabic text and video sites in documents 610. Audio from video sources can be segmented into chunks of 2-minute intervals and then transcribed. Arabic can be translated into English using a state-of-the-art machine translation system. Table 2 lists the average number of documents from each modality-language pair on a daily basis.

TABLE 2

Number of articles downloaded by the crawler daily in different modalities.

| Source | # docs |
|---|---|
| En-Text | 1317 |
| Ar-Text | 813 |
| Ar-Video | 843 |

Subsequent components in the pipeline work on English text documents, and the framework can be easily extended to any language for which translation and transcription systems exist.

Each new textual document 610 may be analyzed by the IE pipeline 620. The first step after tokenization is parsing, followed by mention detection. Within each document, mentions are clustered by a within-document co-reference-resolution algorithm. Thus, in the appropriate context, "Washington" and "White House" are grouped under the same entity (the USA), and "Leon Edward Panetta" and "Leon Panetta" under the same person (Secretary of Defense). Nominal and pronominal mentions are also added to the clusters. A cross-document co-reference system then links the entity clusters across documents. This is done by linking each cluster to the knowledge base (KB) used in the Text Analysis Conference (TAC) Entity Linking task, which is derived from a subset of the Wikipedia Internet encyclopedia. If a match in the KB is found, the cluster is assigned the KB ID of the match, which allows for the cross-referencing of entities across documents. Besides exact match with titles in the KB, the cross-document co-reference system uses soft match features and context information to match against spelling variations and alternate names. The system also disambiguates between entities with identical names. The next IE component extracts relations between the entities in the document, such as employed by, son of, etc. The mention detection, co-reference and relation extraction modules are trained on an internally annotated set of 1301 documents labeled according to the Knowledge from Language Understanding and Extraction (KLUE) 2 ontology. On a development set of 33 documents, these components achieve an F1 of 71.6%, 83.7% and 65% respectively. The entity linking component is unsupervised and achieves an accuracy of 73% on the TAC-2009 person queries.

Annotated documents are then analyzed by the IGMs 630 and IDMs 640 described above. In its basic form, an IGM takes as input a sentence and an entity, and extracts specific information about that entity from the sentence. For example, a specific IGM may detect whether a family relation of a given person is mentioned in the input sentence. A partial list of IGMs and the description of the extracted content is shown in Table 1. The output of the IGMs is then analyzed by IDMs, which assemble the content of the GUI tabs. These tabs either correspond to a question template from a pilot program or are derived from the above-mentioned relations. For each entity, IDMs selectively choose annotations produced by IGMs, group them into equivalence classes, rank the equivalence classes to prioritize the information displayed to the user, and assemble the content of the tab. The IGMs and IDMs are described in still further detail below.

IGMs extract specific information pertaining to a given entity from a specific sentence in two stages: First, they detect whether the snippet contains relevant information. Then they identify information nuggets.

Snippet relevance detection relies on statistical classifiers, trained on three corpora produced as part of the pilot program: i) data provided by Linguistic Data Consortium (LDC) to the pilot program teams during the early years of the program; ii) data provided by BAE Systems; and iii) internally annotated data. The data consist of queries and snippets with binary relevance annotation. The LDC and internally annotated data were specifically developed for training and testing purpose, while the BAE data also include queries from yearly evaluations, the answers provided by the teams that participated to the evaluations, and the official judgments of the answers. The statistical models are maximum entropy classifiers or averaged perceptrons chosen based on empirical performance. They use a broad array of features including lexical, structural, syntactic, dependency, and semantic features. Table 3 summarizes the performance of the models used on the year-4 unsequestered queries, run against an internally generated development set. The "TN" column denotes a template number.

TABLE 3

Performance of the IGM models

| Template | TN | P | R | F |
|---|---|---|---|---|
| Templates for Person Entities | | | | |
| Information | T3 | 75.60 | 90.07 | 82.20 |
| Actions | T13 | 50.00 | 18.33 | 26.83 |
| Whereabouts | T17 | 86.11 | 43.66 | 57.94 |
| Election Campaign | T21 | 78.72 | 26.81 | 40.00 |
| Templates for ORG/GPE Entities | | | | |
| Information | T4 | 71.50 | 90.79 | 80.00 |
| Actions | T14 | 45.83 | 29.73 | 36.07 |
| Arrests of Members | T15 | 75.51 | 74.00 | 74.75 |
| Location of Representative | T18 | 36.36 | 44.94 | 40.20 |

IGMs analyze snippets selected by the template models and extract the information used by the IDMs to assemble and visualize the results. This step is called "Information Nugget Extraction", where an information nugget is an atomic answer to a specific question. Extracted nuggets include the focus of the answer (e.g., the location visited by a person), the supporting text (a subset of the snippet), a summary of the answer (taken from the snippet or automatically generated). Different modules extract specific types of nuggets. These modules can be simple rule-based systems or full statistical models. Each tab uses a different set of nugget extractors, which can be easily assembled and configured to produce customized versions of the system.

IDMs use the information produced by IGMs to visualize the results. This involves grouping results into non-redundant sets, sorting the sets, producing a brief description of each set, selecting a representative snippet for each set, highlighting the portions of the snippet that contain information pertaining to the specific tab, constructing navigation hyperlinks to other pages, and generating the data used to graphically represent the tab content.

IGMs produce results in a generic format that supports a well-defined Application Program Interface (API). IDMs query this API to retrieve selected IGM products. For each tab, a configuration file specifies which IGM products to use for redundancy detection. For example, the content of the Affiliations tab for persons (see Table 1) is constructed from automatic content extraction (ACE)-style relations. The configuration file instructs the IDM to use the relation type and the KB-ID of the affiliated entity for redundancy reduction. Thus, if a snippet states that Sam Palmisano was manager of "IBM", and another that Sam Palmisano was manager of "International Business Machines", and "IBM" and "International Business Machines" have the same KB-ID, then the snippets are marked as redundant for the purpose of the Affiliations tab.

Redundancy detection groups results into equivalence classes. Each class contains unique values of the IGM products specified in the configuration file. IDMs can further group classes into superclasses or split the equivalence classes according to the values of IGM products. For example, they can partition the equivalence classes according to the date of the document containing the information. The resulting groups of documents constitute the unit of display. IDMs assign a score to each of these groups, for example, using a function of the score of the individual snippets and of the number of results in the group or in the equivalence class. The groups are sorted by score, and the highest scoring snippet is selected as representative for the group. Each group is then visualized as a section in the tab, with a title that is constructed using selected IGM products. The score of the group is also optionally shown. The text of representative snippet containing the evidence for the relevant information is highlighted in yellow. The named mentions are linked to the corresponding page, if available, and links to different views of the document are provided.

Each tab is associated with a graphical representation that summarizes its content, and that is shown in the rightmost section of the top half of the GUI of FIG. 6. This visualization is generated dynamically by invoking an application on a server when the tab is visualized.

Exemplary embodiments of the system can support three different visualizations: a word cloud, and two styles of graphs that show connections between entities. A configuration file instructs the IDMs on which IGM products contain the information to be shown in the graphical representation. This information is then formatted to comply with the API of the program that dynamically constructs the visualization.

The exemplary embodiments described above can utilize natural language processing methods well known in the art. A fundamental reference is the book "Foundations of Statistical Natural Language Processing" by Manning and Schutze, which covers the main techniques that form such methods. Constructing language models based on co-occurrences (n-gram models) is taught in Chapter 6. Identifying the sense of words using their context, called word-sense disambiguation is taught in Chapter 7. Recognizing the grammatical type of words in a sentence, called part-of-speech tagging, is taught in Chapter 9. Recognizing the grammatical structure of a sentence, called parsing, is taught in Chapter 11. Automatically translating from a source language to a destination language is taught in Chapter 13. The main topics of Information Retrieval are taught in Chapter 15. Automatic methods for text categorization are taught in Chapter 16.

Given the significant proportion of new material on the Internet that is news that centers around people, organizations and geopolitical entities (GPEs), named entities form a key aspect of news documents and one is often interested in tracking stories about a person (e.g., Leon Panetta), an organization (e.g., Apple Inc.) or a GPE (e.g., the United States). Exemplary embodiments described above provide a system that automatically constructs summary pages for named entities from news data. The EP page describing an entity is organized into sections that answer specific questions about that entity, such as Biographical Information, Statements made, Acquaintances, Actions, and the like. Each section contains snippets of text that support the facts automatically extracted from the corpus. Redundancy detection yields a concise summary with only novel and useful snippets being presented in the default display. The system can be implemented using a variety of sources, and shows information extracted not only from English newswire text, but also from machine-translated text and automatically transcribed audio.

While publicly available news aggregators like Google News show the top entities in the news, clicking on these typically results in a keyword search (with, perhaps, some redundancy detection). On the other hand, the exemplary embodiments described above provide a system that organizes and summarizes the content in a systematic way that is useful to the user. The system is not limited to a bag-of-words search, but uses deeper NLP technology to detect mentions of named entities, to resolve co-reference (both within a document and across documents), and to mine relationships such as employed by, spouse of, subsidiary of, etc., from the text. The framework is highly scaleable and can generate a summary for every entity that appears in the news in real-time. The flexible architecture of the system allows it to be quickly adapted to domains other than news, such as collections of scientific papers where the entities of interest are authors, institution, and countries.

The methodologies of the exemplary embodiments of the present disclosure may be particularly well-suited for use in an electronic device or alternative system. Accordingly, exemplary embodiments may take the form of an embodiment combining software and hardware aspects that may all generally be referred to as a "processor", "circuit," "module" or "system." Furthermore, exemplary implementations may take the form of a computer program product embodied in one or more computer readable medium(s) having computer readable program code stored thereon.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fibre, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of the exemplary embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Exemplary embodiments are described herein with reference to flowchart illustrations and/or block diagrams. It will be understood that each block of the flowchart illustrations and/or block diagrams, and combinations of blocks in the flowchart illustrations and/or block diagrams, can be implemented by computer program instructions.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the present disclosure is not limited to those precise embodiments, and that various other changes and modifications may be made therein by one skilled in the art without departing from the scope of the appended claims.

What is claimed is:

1. A method for processing information by a processing device, the method comprising:
   receiving a user query;
   inferring a user query intention from the user query to develop an inferred user intention;
   detecting a query type of the inferred user intention selected from a set of query types comprising a person type, an organization type, and an event type;
   identifying a plurality of information categories based on the query type;
   searching for information within each of the plurality of information categories based on identifying the plurality of information categories, wherein the searching is further based on natural language processing of a corpus of documents having multiple modalities comprising at least one of text, audio and video;
   identifying a plurality of items in the searched information for each of the plurality of information categories, wherein each of the plurality of items comprises a span of text from the corpus of documents including two or more entities and a relation mention explicitly describing a relation between the two or more entities;
   organizing the items into a plurality of equivalence classes, wherein each item having a same equivalence class comprises an equivalent relation mention;
   selecting a representative item from the plurality of items for each of the equivalence classes; and
   automatically generating a page in response to the user query by adaptively building a template with a plurality of page elements that correspond to the plurality of information categories based on the inferred user intention, wherein each of the plurality of page elements displays the searched information for a single information category from the plurality of information categories based on the selected representative items.

2. The method of claim 1, further comprising: when the user query selects a person who has a political status, detecting the political status, and identifying the information categories comprising at least one of an election campaign, public appearances, statements, and public service history based on detecting the political status.

3. The method of claim 1, further comprising: when the user query selects a company identifying the information categories comprising at least one of recent news about the company, information on the company's top officials, and press releases for the company based on the user query selecting the company.

4. The method of claim 1, further comprising: when the user query selects an event identifying the information categories comprising at least one of news items about the event and reactions to the event based on the user query selecting the event.

5. The method of claim 4, wherein entities in the event are identified and relevant information about the entities is searched.

6. A non-transitory computer program storage device embodying instructions executable by a processor, the non-transitory computer program storage device comprising storage memory configured to store:
   program code that receives a user query;
   program code that infers a user query intention from the user query to develop an inferred user intention;
   program code that detects a query type of the inferred user intention selected from a set of query types comprising a person type, an organization type, and an event type;
   program code that identifies a plurality of information categories based on the query type;
   program code that searches for information within each of the plurality of information categories based on identifying the plurality of information categories, wherein the searching is further based on natural language processing of a corpus of documents having multiple modalities comprising at least one of text, audio and video;
   program code that identifies a plurality of items in the searched information for each of the plurality of information categories, wherein each of the plurality of items comprises a span of text from the corpus of documents including two or more entities and a relation mention explicitly describing a relation between the two or more entities;
   program code that organizes the items into a plurality of equivalence classes, wherein each item having a same equivalence class comprises an equivalent relation mention;
   program code that selects a representative item from the plurality of items for each of the equivalence classes; and
   program code that automatically generates a page in response to the user query by adaptively building a template with a plurality of page elements that correspond to the plurality of information categories based on the inferred user intention, wherein each of the plurality of page elements displays the searched information for a single information category from the plurality of information categories based on the selected representative items.

7. The non-transitory computer program storage device of claim 6, further comprising: program code that, when the user query selects a person who has a political status, detects the political status, identifies the information categories comprising at least one of an election campaign, public appearances, statements, and public service history based on detecting the political status.

8. The non-transitory computer program storage device of claim 6, further comprising program code that, when the user query selects a company, identifies the information categories comprising at least one of recent news about the company, information on the company's top officials, and press releases for the company based on the user query selecting the company.

9. The non-transitory computer program storage device of claim 6, further comprising program code that, when the user query selects an event, identifies the information categories comprising at least one of news items about the event and reactions to the event based on the user query selecting the event.

10. The non-transitory computer program storage device of claim 9, wherein entities in the event are identified and relevant information about the entities is searched.

11. A method for processing information by a processing device, the method comprising:
    receiving a user query;

inferring a user query intention from the user query to develop an inferred user intention;
detecting a query type based on the inferred user intention;
searching for a plurality of information categories in a corpus of documents based on the query type;
identifying a plurality of items for each of the plurality of information categories based on the search, wherein each of the plurality of items comprises a span of text from the corpus of documents including two or more entities and a relation mention explicitly describing a relation between the two or more entities;
organizing the items into a plurality of equivalence classes, wherein each item having a same equivalence class comprises an equivalent relation mention;
selecting a representative item from the plurality of items for each of the plurality of equivalence classes; and
generating a page based on the query type, the page comprising a plurality of tabs, wherein each tab contains the representative items corresponding to the plurality of equivalence classes of an information category from the plurality of information categories.

12. The method of claim 11, further comprising:
scoring each of the equivalence classes; and
prioritizing the equivalence classes based on the scoring.

* * * * *